(12) United States Patent
Fabian et al.

(10) Patent No.: US 10,234,635 B1
(45) Date of Patent: Mar. 19, 2019

(54) MODULAR INSERT ASSEMBLY

(71) Applicant: TE CONNECTIVITY CORPORATION, Berwyn, PA (US)

(72) Inventors: David James Fabian, Mount Joy, PA (US); James Patrick Mosier, Palmyra, PA (US); Douglas Harold Rohde, Hershey, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/876,986

(22) Filed: Jan. 22, 2018

(51) Int. Cl.
*G02B 6/38* (2006.01)
*G02B 6/42* (2006.01)
*H01R 13/52* (2006.01)
*H01R 24/62* (2011.01)

(52) U.S. Cl.
CPC ......... *G02B 6/3817* (2013.01); *G02B 6/3825* (2013.01); *G02B 6/3879* (2013.01); *G02B 6/3887* (2013.01); *G02B 6/3897* (2013.01); *G02B 6/4293* (2013.01); *H01R 13/5202* (2013.01); *H01R 13/5221* (2013.01); *H01R 24/62* (2013.01)

(58) Field of Classification Search
CPC ............................ G02B 6/3879; G02B 6/3817
See application file for complete search history.

(56) References Cited

U.S. PATENT DOCUMENTS

| 7,367,832 B2 * | 5/2008 | Muhs | G02B 6/3879 439/318 |
| 9,755,382 B2 * | 9/2017 | Gniadek | H01R 24/66 |
| 2017/0153399 A1 * | 6/2017 | Rodriguez | G02B 6/3897 |

* cited by examiner

*Primary Examiner* — Omar R Rojas (57) ABSTRACT

A connector comprising: (a) shell acing a cavity configured to receive a single conventional insert (b) one or more modular inserts, each modular insert having a form factor ½ to ¼ of the form factor of said conventional insert, such that said cavity is capable of receiving 2 to 4 said modular inserts; (c) said each modular insert having at least: (i) a housing having a front opening and a rear opening, (ii) an interface disposed in said front opening, said interface presenting one or more conductors, said conductors extending from said interface rearward through said rear opening and into a jacketed cable, (iii) a crimp portion rearward of said rear opening, said jacketed cable being secured to said crimp portion, and (iv) one or more seals sealing said front and rear opening such that said interior of said housing is sealed from environment.

20 Claims, 7 Drawing Sheets

MODULAR INSERT ASSEMBLY

FIELD OF INVENTION

The present invention relates generally to ruggedized connectors, and, more specifically, to enhancing the density and diversity of conductors used in such ruggedized connectors.

BACKGROUND OF INVENTION

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

Of particular interest herein, are ruggedized connectors. Such connectors typically comprise an outer housing and shell defining one or more cavities for holding inner assemblies or "inserts." Numerous United States Military specifications describe such ruggedized connectors, including, for example, MIL-C-38999, MIL-C-5015 and ARINC600 among others. Likewise, similar connectors have become common in Europe, and include, for example, European modular rectangular connectors EN4644 and EN4165, which are commonly used for seat-to-seat electrical signal connections in commercial aircraft. Many of these multi-cavity connectors use common or similarly-sized optical termini. For example; the current TE size 16 expanded beam (EB) termini are designed with a similar dimensional envelope as that of the well-known fiber optic physical contacts: MIL-29504/4D/5D.

Figure 1:
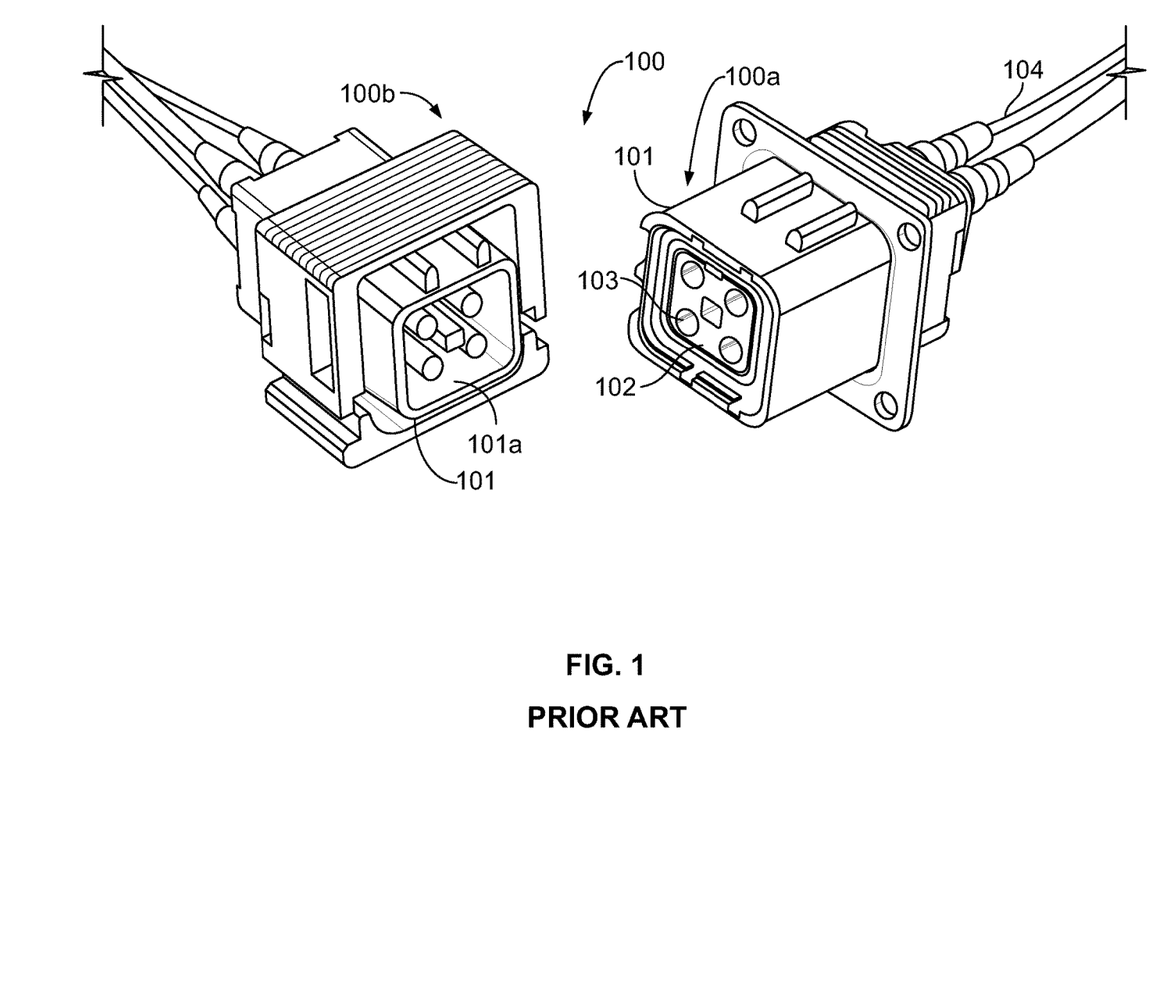
FIG. 1 shows a plug and receptacle halves of a prior art EN4165 connector.

Referring to FIG. 1, a prior art optical EN4165 connector 100 is shown. Connector 100 comprises a plug connector 100A and a receptacle connector 100B. Each of the plug and receptacle connector halves has a shell 101, which defines a cavity 101a in which an insert 102 is disposed. The insert has a known and standard form factor. The insert defines a plurality of discrete cavities in which discrete contacts 103 are disposed. The contacts are discrete assemblies. The type of contact used can vary according to the connector. For example, in some embodiments, the contacts may comprise optical fiber conductors terminated with a specially-machined ferrule, and, in other embodiments, the contacts may be metallic conductors terminated with a metal contact as is known in the art. In the embodiment of FIG. 1, the connector is an optical connector, in which the contacts comprise an optical fiber terminated with a single fiber round ferrule. Although a single-fiber ferrule is depicted, other embodiments are common, including, for example, an insert having a rectangular cavity for receiving a multifiber ferrule. The optical fiber passes through the insert and exits the back of the insert as shown in FIG. 1. In this embodiment, the fibers are grouped into four jacketed cables 104 exiting the rear of each connector.

Although ruggedized connectors having inserts with contacts are popular and generally effective, Applicants recognize the need to diversify the types of conductors that are used in a given connector. That is, rather than just having all electrical or all optical conductors in a given insert, Applicants understand the need to have hybrid connectors, which have a combination of both electrical and optical conductors.

However, having a mix of electrical and optical conductors within a single insert poses several problems. First, hybrid applications necessitate different configurations of optical and electrical contacts within a given insert, but it is costly to develop each insert configuration to integrate a ferrule cavity along with a specific pattern of electrical contacts. Second, managing both electrical and optical fiber cabling from a single insert is difficult. That is, the large number of intermingled fiber and electrical conductors extending from the rear of an insert is difficult to manage especially since copper and optical fibers often need to be run in different routes and treated differently, including maintaining a minimum bend radius for optical fibers. Third, securing and sealing different cables containing different conductors to an insert is difficult, especially given the small size of the inserts Fourth, unlike electrical contacts, optical contacts need to be serviced (cleaned) regularly, which may require removing the contact and cleaning the ferrule. Without removal, cleaning a ferrule end face in the midst of intermingled electrical contacts is difficult. Further, if one contact is removed—e.g., for more extensive cleaning or replacement—it may be difficult to access the ferrule for removal, and its removal and reinstallation may compromise the sealing members. Still other challenges face the design of hybrid inserts for ruggedized connectors.

Therefore, there is a need for a hybrid connector that overcomes one or more of the aforementioned problems. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention integrates a contact with an insert to form a sealed modular insert, which is just a fraction of the size of the insert cavity, thereby allowing a plurality of modular inserts to be disposed in a single cavity of the connector shell. Such an approach has a number of important advantages.

First, because the modular insert is just a fraction of the cavity, different modular inserts can be used within a single cavity to impart a degree of diversity in the conductor type within the cavity. For example, one modular insert may be optical and another modular insert may be electrical. This allows the connector of the present invention to provide the benefits of segregated conductors (optical or electrical conductors) in a single modular insert, yet allow for one or more additional modular inserts in the same cavity to provide conductor diversity within the cavity. Additionally, because the modular inserts are discrete, different modular types (optical and electrical) can be mixed and matched without having to mold/machine unique inserts for each combination.

Likewise, because the modular inserts are dedicated, the conductors extending from the rear of the inserts can be managed more readily because they are not intermingled with different conductor types. This also allows a cable of a particular type of conductor, e.g., jacketed optical fiber, to be crimped to a particular modular insert to provide a mechanically rugged termination of the insert to the cable. To facilitate additional control over the conductors extending from the rear of the modular insert, the present invention includes, in one embodiment, a cable control member associated with each discrete modular insert. In one embodiment, these cable control members are curved so as to direct the conductors extending from the modular inserts in a particular direction. This allows optical conductors to be routed in one direction and copper conductors to be routed in a different direction.

Furthermore, because the modular inserts are discrete, they can be installed and removed discretely, thereby facilitating individual modular insert cleaning or service, without disturbing other modules in the shell.

Yet another advantage is the elimination of the contact within the insert. In one embodiment, the modular insert of the present invention receives a standard fiber optical ferrule directly, without a contact. Not only does this reduce costs and inventory requirements, but also economizes on space, making the modular insert of the present invention smaller than a conventional insert having the same number of conductors.

Another aspect of the present invention is that each modular insert is sealed. That is, rather than sealing the cavity as conventionally done, the cavity is left essentially open to the environment, yet the modular inserts themselves are each individually sealed. This can be done in a variety of ways including for example seals on both the front and back ends of the housing of the modular inserts.

Therefore, invention involves discrete modular inserts which have a fraction of the form factor of the cavity, allowing the modular inserts themselves to be dedicated to a particular conductor type, yet allow for diversity within the cavity by having different modular inserts of different conductor types.

Accordingly, in one embodiment, the invention relates to a connector comprising: (a) a shell having a cavity configured to receive a single conventional insert having one or more contacts, the conventional insert having a conventional form factor; (b) one or more modular inserts, each modular insert having a reduced form factor of 1/x of the conventional form factor, such that the cavity is capable of receiving x number of the modular inserts; (c) the each modular insert having at least: (i) a housing having a front and rear orientation, an interior, and a front opening and a rear opening, (ii) an interface disposed in the front opening, the interface presenting one or more conductors, the conductors extending from the interface rearward through the rear opening and into a jacketed cable, (iii) a crimp portion rearward of the rear opening, the jacketed cable being secured to the crimp portion, and (iv) one or more seals sealing the front and rear opening such that the interior of the housing is sealed from environment.

BRIEF DESCRIPTION OF DRAWINGS

FIG. 6A through FIG. 6C show different embodiments of the connector of the present invention with different combinations of modular inserts.

DETAILED DESCRIPTION

Figure 2:
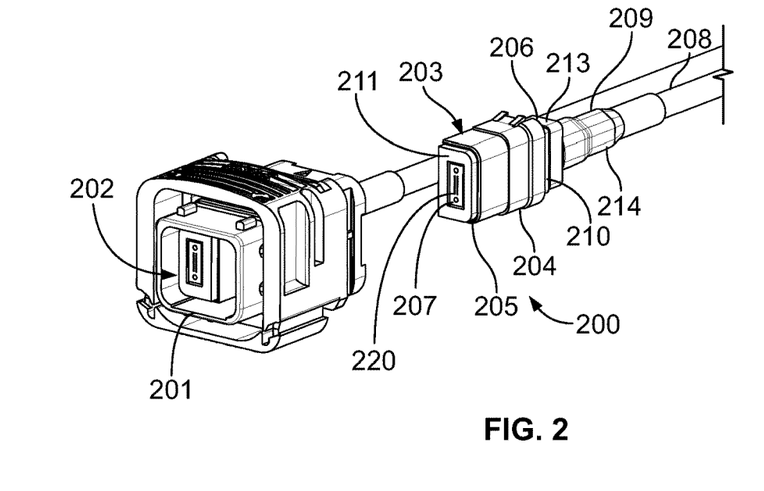
FIG. 2 shows a forward perspective view of a receptacle connector of the present invention with one modular insert installed and a second modular insert in position to be installed.
Figure 3:
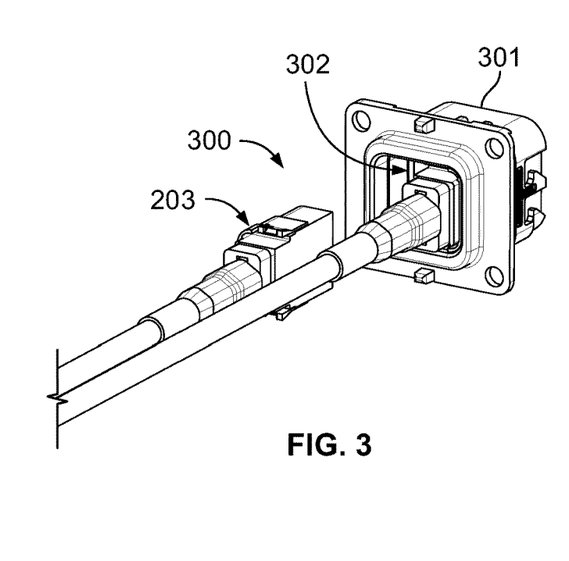
FIG. 3 shows a rear perspective view of a plug connector of the present invention with one modular insert installed and another in position to be installed.

Referring to FIGS. 2 and 3, one embodiment of the receptacle and plug connectors 200, 300 of the present invention are shown. Each connector 200, 300 comprises a shell 201 having a cavity 202 configured to receive a single conventional insert having one or more contacts (see, e.g. insert 102 having contacts 103 as shown in FIG. 1). The conventional insert has a conventional form factor. As used herein, the form factor of an insert is defined as its periphery when viewed axially. The connector of the present invention has one or more modular inserts 203. Each modular insert having a reduced form factor of 1/x of the conventional form factor, such that the cavity is capable of receiving x number of the modular inserts. Each modular insert has at least a housing 204 having a front and rear orientation, an interior 507 (see FIG. 5*b*), and a front opening and a rear opening 205, 206. The modular insert also has an interface 207 disposed in the front opening, and the interface presents one or more conductors 220. The conductors extend from the interface rearward through the rear opening and into a jacketed cable 208, which may be round or oval or other configuration depending on application. The modular insert also comprises a crimp portion 209 (see also FIG. 5A) rearward of the rear opening 206. The jacketed cable is secured to the crimp portion. One or more seals 210, 211, 214 seal the front and rear opening 205, 206 such that the interior of the housing is sealed from environment.

These features are described in greater detail below and in connection with selected alternative embodiments. Although the EN416 insert is illustrated in this disclosure, it should be understood that other connector types are possible. Indeed, as mentioned above, there are a variety of ruggedized connectors having cavities for inserts, including, for example, EN 4165, MIL-C-38999, ARINC 600, EN 3545, EN 4644, plus others. Indeed, it is anticipated that the modular inserts disclosed herein can be used in a variety of different ruggedized connectors.

The modular inserts of the present invention facilitate a variety of different connector configurations. As described above, the modular inserts of the present invention are a mere fraction of the form factor of a conventional insert. For example, an insert for a EN4165 cavity has a form factor of approximately 14.4 mm×12.7 mm. These are well known standardized form factors. The modular insert of the present invention is a fraction (1/x) of this form factor. The fraction 1/x can vary, and generally ranges from ½ to ¼. As the fraction decreases, the modular inserts may become so small that they may be less desirable. In one embodiment, x is 2 such than each modular insert is essentially half of the form factor of a traditional insert. Although this disclosure considers x=2, it should be understood that other embodiments are possible.

Figure 6A:
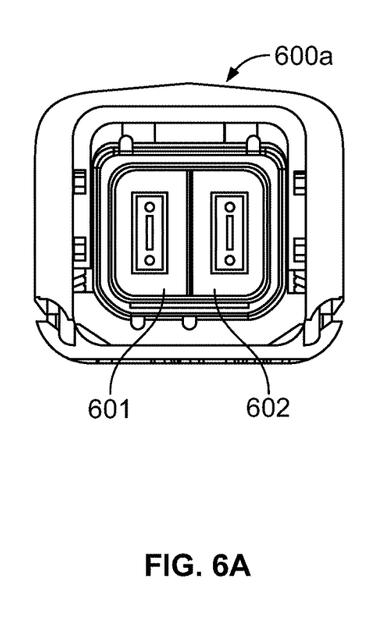
FIG. 6A shows connector comprising two essentially identical optical modular inserts.
Figure 6B:
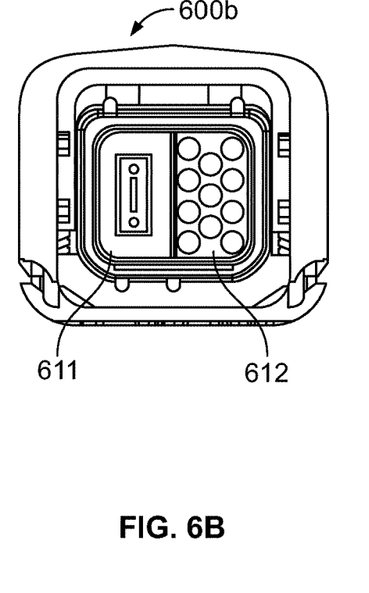
FIG. 6B shows connector comprising an optical modular insert and an electrical modular insert.
Figure 6C:
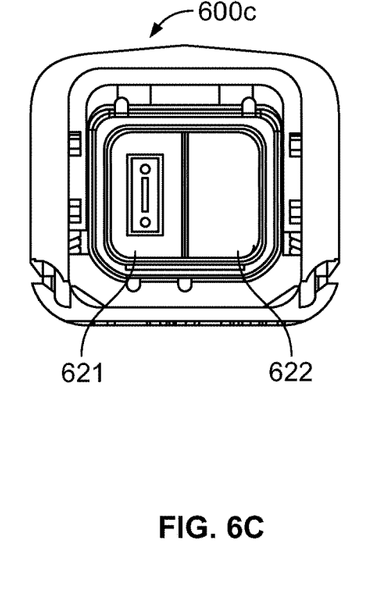
FIG. 6C shows connector comprising just a single optical modular insert and a blank filler module for future expansion.

In one embodiment, the connector has first and second modular inserts. These modular inserts can be the same or they can be different. For example, referring to FIG. 6A through FIG. 6C different modular inserts configurations are shown. For example, in FIG. 6A, connector 600A comprises two essentially identical optical modular inserts 601 and 602. In FIG. 6B, connector 600B comprises an optical modular insert 611 and an electrical modular insert 612. In FIG. 6C, connector 600C comprises just a single optical modular insert 621 while space 622 is left open. Still other embodiments will be obvious to those who have skill in the art in light of this disclosure. Because the modular inserts of the present invention can be configured in different ways within a given cavity, there is no need for specially configured hybrid inserts as are used in the prior art.

As mentioned above one of the benefits of the claimed invention is the integration of the contact with the insert. This avoids the need to prepare special contacts for insertion in the insert. In one embodiment, the optical modular insert is prepared by first terminating the optical cable with a ferrule and then inserting the terminated cable into the insert such that the ferrule seats in the front opening of the insert housing. Such an approach therefore avoids the need to first install the ferrule in a contact. Additionally, this approach avoids the need to custom-machine special ferrules (or otherwise modify standard ferrules) for contact assemblies. Rather, the insert can be configured with an opening to receive a standard ferrule. For example, as shown in FIG. 2, the insert 203 comprises a front opening 205 in which is disposed an interface 207 which is a conventional ferrule. In this embodiment, the ferrule is a standard off-the-shelf MT ferrule, although it can be any known ferrule, such as, for example, an MT, LMT (lensed MT), MPO, or other multi-fiber ferrule, or, alternatively, single-fiber ferrules, such as the LC or MU ferrules. Those of skill in the art will appreciate that any variety of ferrules can be used in the modular insert of the present invention. Alternatively, the interface may present electrical conductors and comprise metallic contacts as is well known.

In one embodiment, each discrete modular insert is sealed from the environment. This is different from the prior art approach in which the standard form-factor insert was environmentally sealed with the contacts in place. Although this prior art approach has been satisfactory, flexibility to effectively combine electrical and optical conductors may be limited. Those skilled in the art will understand different ways of sealing the discrete inserts in light of this disclosure. In one embodiment, the seals are provided on the front and back ends of the inserts to insulate the interior of the housing from the environment. For example, referring to FIGS. 2 and 5A, a front seal 211 is disclosed between the interface 207 and the insert housing 204. Likewise, a rear seal 210 is disposed between the housing and a rear portion 213. In one embodiment, the termination of the cable 208 to the modular insert is also sealed. Specifically, in one embodiment, a heat shrink material 214 is disposed around the termination of the jacketed cable to the modular insert, essentially over the crimped portion 209 as shown in FIG. 2 and FIG. 5A.

Figure 4:
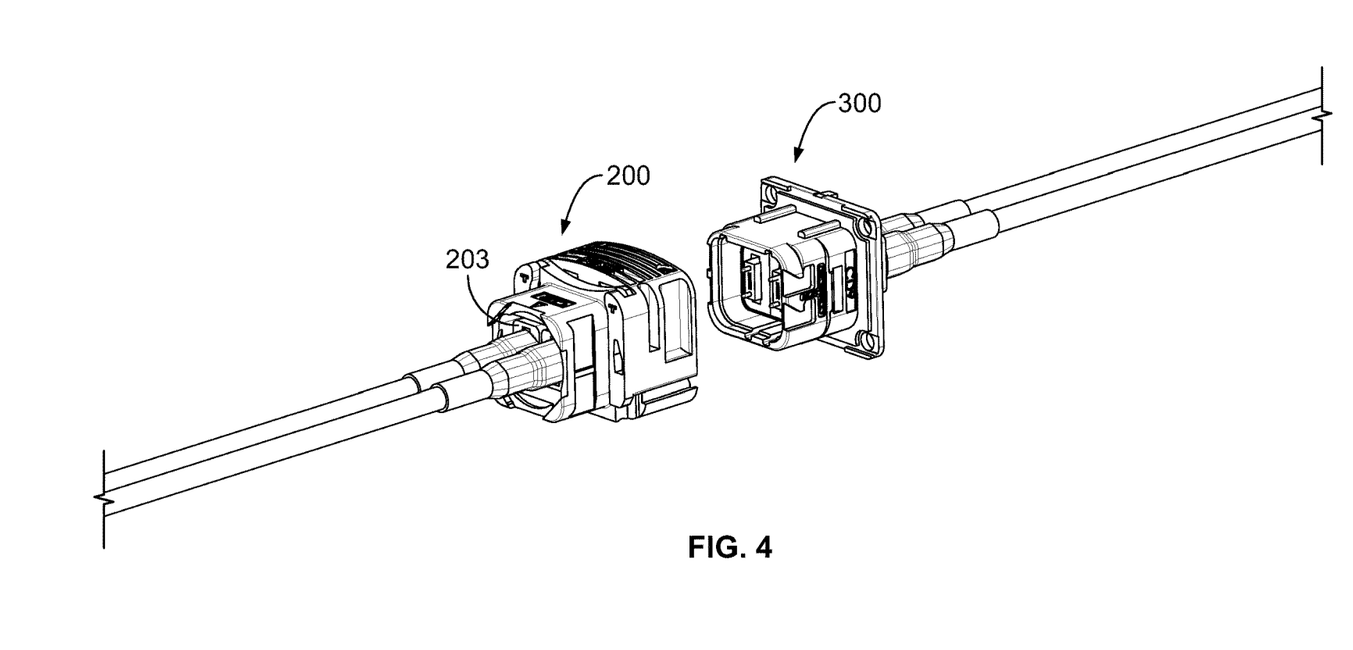
FIG. 4 shows the receptacle connector of FIG. 2 and the plug connector of FIG. 3 in position to be mated.

Although various embodiments of this jacketed cable seal are within the scope of the invention, in this particular embodiment, a thin heat shrink material is used. The use of a heat shrink material provides for a low profile covering. This has the advantage of having reduced bulk around the cable termination. This is important particularly in certain connector configurations in which there is very little room for bulky grommet-type seals. For example, standard inserts, such as the EN4165 insert, do not provide enough space for a rear grommet seal around the jacketed cable. For example, referring to FIG. 3 and FIG. 4, it should be clear that when both modular inserts 203 are inserted into the housing, there is very little room for anything to extend beyond the form factor of the insert housing. Accordingly, in this embodiment, the jacketed termination seal is within the form factor of the housing 204. As used herein, the form factor of a housing as defined as its periphery when viewed axially.

Figure 5A:
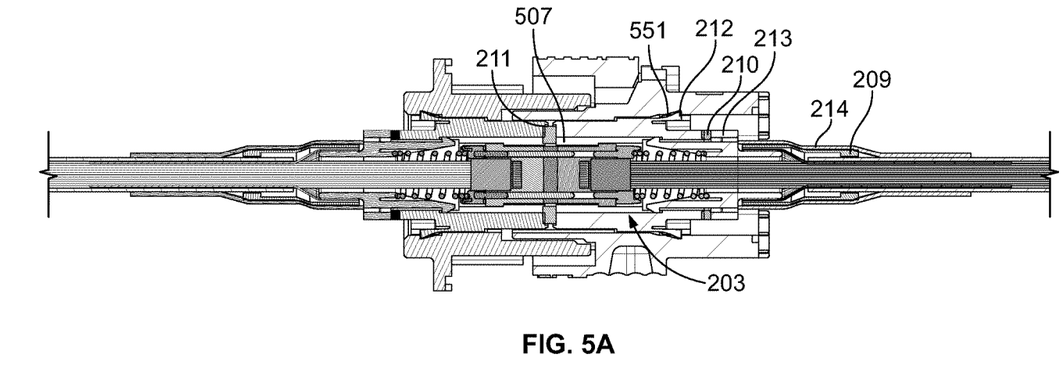
FIG. 5A shows a side-view cross section of the connectors shown in FIG. 4 mated.
Figure 5B:
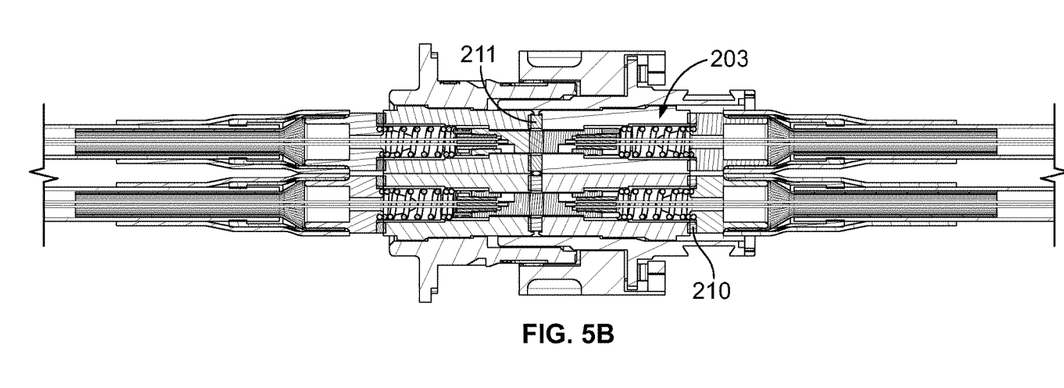
FIG. 5B shows a top-view cross section of the connectors shown in FIG. 4 mated.

Referring to FIGS. 5A and 5B, in one embodiment, the housing is secured within the shell by means of the first and second latch elements. Specifically, the housing comprises a first latch element 212, which is configured to inter-engage with a second latch element 551, which is defined on the interior of the shell as shown in FIG. 5A. Such latch mechanisms are generally well known and will not be described herein in detail. Suffice to say, however, that in this particular embodiment, the latching mechanism of each modular insert is independently actuatable. In other words each latch can be actuated individually for an individual modular insert thereby facilitating the installation/removal of each modular insert without disturbing the adjacent modular insert(s). Such a feature is important for installation and maintenance. For example, while copper connectors generally involve a swiping action during their mating with another connector, and, thus, stay clean due to the swiping action, the performance of optical connectors generally diminishes with repeated mating due to the accumulation of debris on the front face of the ferrule. Therefore, often it is necessary to remove optical connectors to clean the front face of the ferrule. The modular insert configuration of the present invention facilitates this by allowing optical inserts to be readily removed and cleaned while leaving their copper/metallic counterparts in place.

Figure 7A:
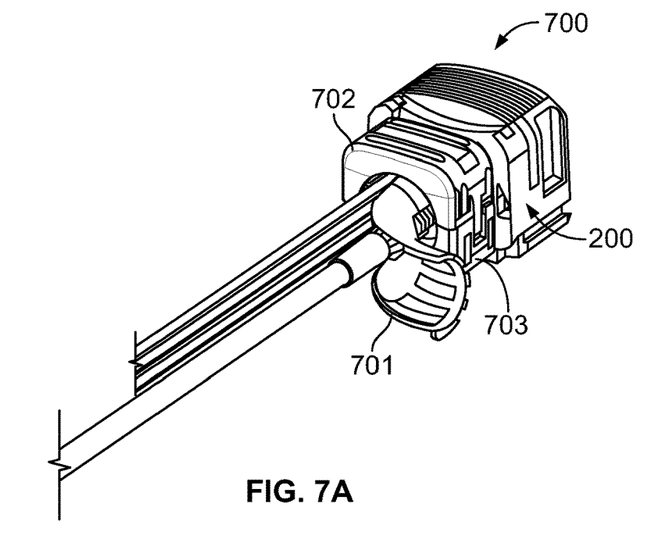
FIG. 7A shows a set of connectors of the present invention with cable control members disclosed in different directions to facilitate the handling of different conductors.
Figure 7B:
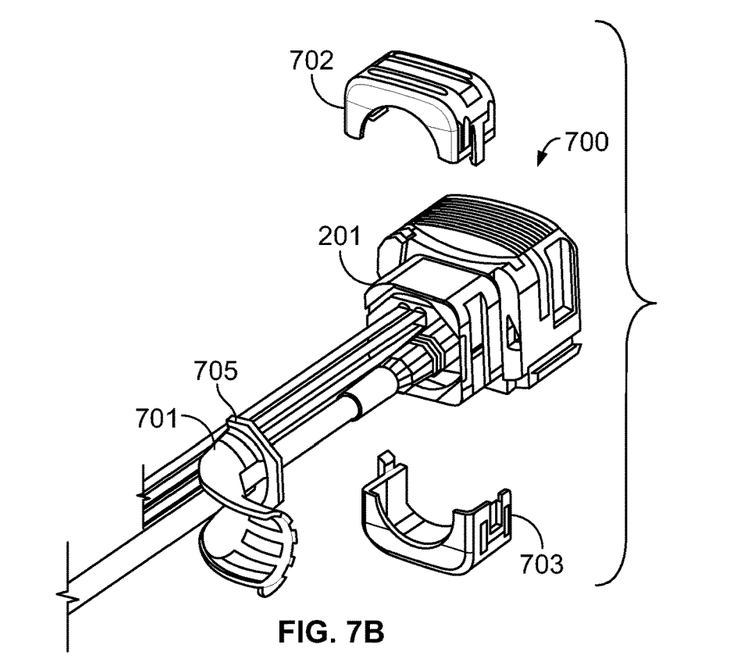
FIG. 7B shows an exploded view of the embodiment of FIG. 7A.

In one embodiment, the modular insert comprises a cable control member for managing the conductors extending from the modular insert. For example, referring to FIG. 7, one embodiment of the cable control element is shown. FIG. 7A shows a connector 700 having a cable control element 701 which is secured to the shell 201 of the connector 200 by means of clamp shells 702 and 703 as shown. FIG. 7B shows as exploded view of this configuration. In one embodiment, the cable control member 701 is curved as shown in FIGS. 7A and 7B to direct conductors extending from the modular insert. In this particular embodiment, it is configured as a 90° turn. Alternatively, the turn may be greater than or less than 90°. In one embodiment, the cable control member 701 is capable of being rotated in different positions. For example, in FIG. 7A, the cable control member 701 is at the three o'clock position as viewed from the back of the modular insert 700. In one embodiment, the cable control member 701 has a faceted base configuration 705 that allows it to be incrementally rotated in different positions. For example, the cable control member embodiment of FIG. 7A can be rotated in 45° increments, although other embodiments, are possible, e.g., 90°, 60°, 30° increments, etc.

Figure 8:
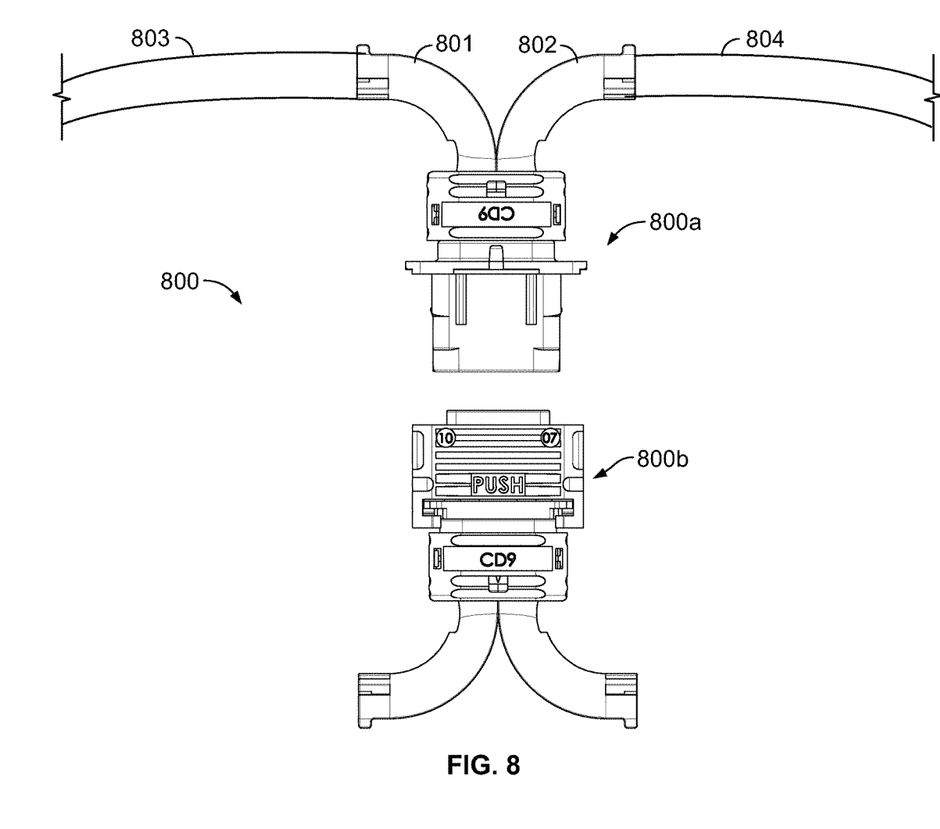
FIG. 8 shows a set of connectors of the present invention with cable control members directing optical and electrical conductors in different directions as the leave the connector.

Referring to FIG. 8, a set of connectors 800 is shown, which includes a plug connector 800A and a receptacle connector 800B. Each connector has two cable control members 801 and 802. Each one is disposed in a different position. For example, the cable control member 801 for connector 800A is disposed at the three o'clock position, while the cable control member 802 is disposed at the nine o'clock position. As mentioned above, these positions are given from the perspective of viewing the connector from behind. Such a configuration has a number of benefits. For example, as shown in FIG. 8, cable control member 801 directs the copper conductors 803 in one direction and the cable control member 802 directs the jacketed optical fiber 804 in a different direction. Indeed, by configuring the two cable control members at the three and nine o'clock positions respectively, the different conductors diverge at 180°. Such an embodiment may be preferred in managing different conductors as often they need to be run in different directions and to generally be treated differently. (For example, optical fiber have a minimum bend radius which must be observed at all times while copper conductors do not have such a limitation.)

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A connector comprising:
   a shell having a cavity configured to receive a single conventional insert having one or more contacts, said conventional insert having a conventional form factor,
   one or more modular inserts, each modular insert having a reduced form factor of 1/x of said conventional form factor, wherein said 1/x ranges from ½ to ¼, such that said cavity is capable of receiving x number of said modular inserts, wherein x ranges from 2 to 4;
   said each modular insert having at least:
      a housing having a front and rear orientation, an interior, and a front opening and a rear opening,
      an interface disposed in said front opening, said interface presenting one or more conductors, said conductors extending from said interface rearward through said rear opening and into a jacketed cable,
      a crimp portion rearward of said rear opening, said jacketed cable being secured to said crimp portion,
      one or more seals sealing said front and rear opening such that said interior of said housing is sealed from environment.

2. The connector of claim 1, wherein said one or more seals comprises a front seal between said interface and said housing.

3. The connector of claim 1, wherein said each modular insert also comprises a rear portion disposed in said rear opening, wherein said one or more seals comprises a rear seal between said housing and said rear portion.

4. The connector of claim 1, wherein said one or more seals comprises a heat shrink material over a portion of said jacketed cable crimped to said crimp portion.

5. The connector of claim 1, further comprising a cable control disposed rearward of said crimp portion.

6. The connector of claim 5, wherein said cable control is configured as a bend in a certain position.

7. The connector of claim 6, wherein said connector comprises a plurality of modular inserts, and said cable control of each said modular insert is configured in a different position.

8. The connector of claim 7, wherein said positions are 45° increments.

9. The connector of claim 8, wherein said plurality of modular inserts comprises a first and second modular insert, and said cable control of said first modular insert is at a 3 o'clock position, and said cable control of said second modular insert is at a 9 o'clock position.

10. The connector of claim 9, wherein one of said first or second modular inserts, comprises optical conductors, and the other comprises metallic conductors.

11. The connector of claim 1, wherein x is 2.

12. The connector of claim 11, wherein said one or more modular inserts comprises first and second modular inserts.

13. The connector of claim 12, wherein said first and second modular inserts are different.

14. The connector of claim 13, wherein said first modular insert comprises optical conductors and said second modular insert comprises electrical conductors.

15. The connector of claim 1, wherein said interface is a standard ferrule.

16. The connector of claim 15, wherein said standard ferrule is an MT ferrule.

17. The connector of claim 1, wherein said housing comprises at least one first latch element to latch to a corresponding second latch element defined in said cavity of said shell.

18. The connector of claim 17, wherein said first latch element of said each modular insert is independently actuatable from other said modular inserts such that said each modular insert is independently insertable and removable from said cavity of said shell.

19. The connector of claim 1, wherein said conventional insert is one of an EN4165, ARINC 600, EN3545, EN4644 or D38999 insert.

20. The connector of claim 19, wherein said conventional insert is said EN4165.

* * * * *